A. B. DEMBRUN.
Portable Furnace.
No. 222,676.                    Patented Dec. 16, 1879.
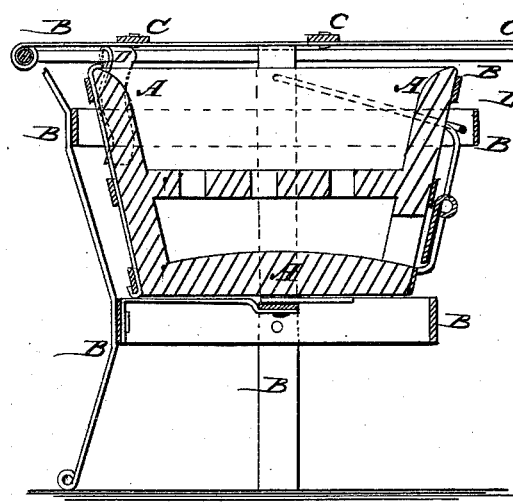
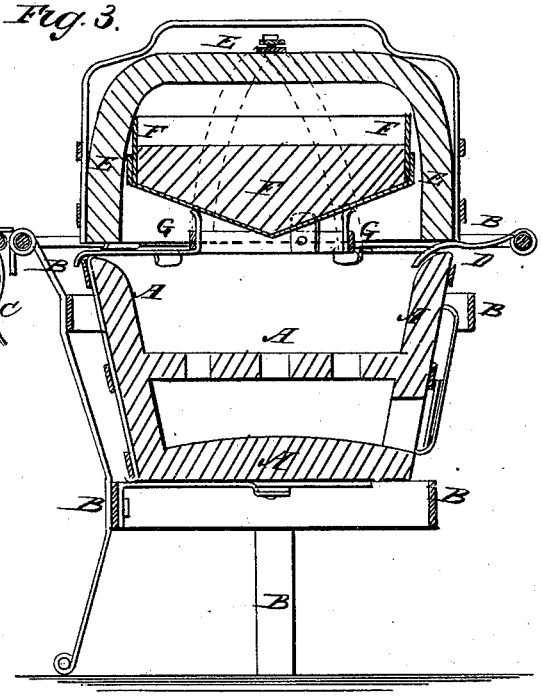
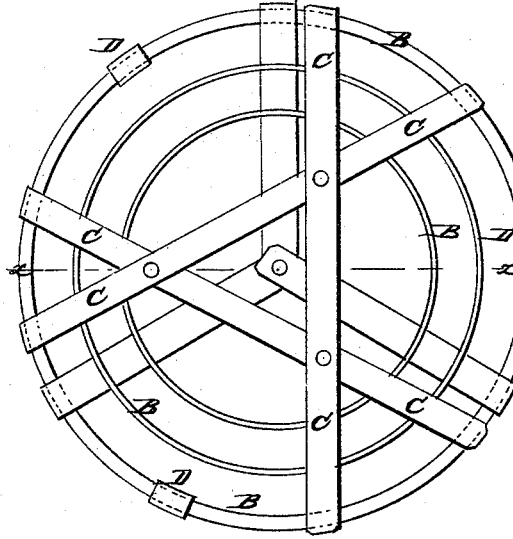
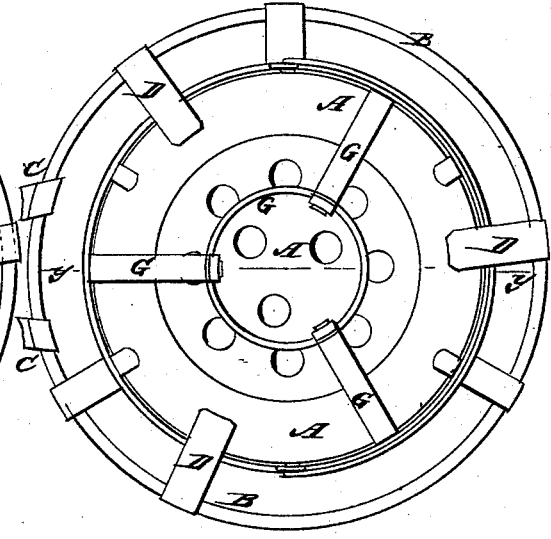
WITNESSES:
Francis McArdle
C. Sedgwick
INVENTOR:
A. B. Dembrun
BY Munn & Co
ATTORNEYS.

UNITED STATES PATENT OFFICE.

ANTOINE B. DEMBRUN, OF NEW ORLEANS, LOUISIANA.

IMPROVEMENT IN PORTABLE FURNACES.

Specification forming part of Letters Patent No. 222,676, dated December 16, 1879; application filed July 10, 1879.

*To all whom it may concern:*

Be it known that I, ANTOINE BERNARD DEMBRUN, of New Orleans, Orleans parish, and State of Louisiana, have invented a new and useful Improved Cooking and Baking Furnace, of which the following is a specification.

Figure 1 is a vertical section of my improved furnace arranged for cooking, taken through the line X X, Fig. 2. Fig. 2 is a top view of the basket and hinged grate, the furnace being removed. Fig. 3 is a vertical section of the same arranged for baking, taken through the line Y Y, Fig. 4. Fig. 4 is a top view of the same, the oven and baking-pan being removed.

Similar letters of reference indicate corresponding parts.

The object of this invention is to furnish an improved furnace for cooking and baking, and various other uses, which shall be simple in construction and convenient and effective in use.

The invention consists in the combination of the furnace, the basket, and the hinged grate with each other, and in the combination of the hinged supporters, the detached grate, the baking-pan, and the oven with the furnace and the basket.

A is the furnace, which is made of baked clay, strengthened with iron straps, and provided with a perforated partition and a draft-opening closed with a slide, and is similar to an ordinary furnace, except that it is lower and wider.

B is a basket, formed of iron straps, and made of such a shape and size as to readily hold the furnace A and support it at a proper distance from the ground, the side straps extending down beneath its bottom to serve as feet. The upper ends of the side straps extend a little above the top of the furnace A, are bent outward a little, and are attached to a rod, as shown in the drawings.

To the top rod of the basket is hinged a grate, C, which is made of such a size as to rest upon the said top rod of the basket B, above the top of the furnace A, to receive and support pans and other vessels for frying, boiling, and other operations.

To the top rod of the basket B are hinged three or more iron straps, D, of such a length that when turned inward their free ends will rest upon the top of the furnace A to support the oven E.

When not required for use the supporters D are allowed to hang down upon the outside of the basket B, as shown in Fig. 1.

The oven E is formed of a shallow dish of baked clay, strengthened with iron straps, and of sufficient size to contain within it the baking-pan F and the bread or other substance to be baked.

The baking-pan F is composed of baked clay, incased upon the bottom and sides with sheet-iron, the side casing rising above the said baked clay to a suitable height to confine the article to be baked. When the baking-pan is in use it stands upon a detached grate, G, which rests upon the top of the furnace A, and is so formed as to center the said baking-pan and hold it firmly in place.

In using the furnace for baking, the grate C is turned back, the supporters D are turned in, and the oven E is placed upon the said supporters D and left a few minutes to become heated. The oven E is then removed, the grate G is put on, the baking-pan F and its contents are placed upon the said grate G, and the oven E is placed over it, and the substance will be quickly and thoroughly baked.

The furnace A and its appliances may be made round, square, or of any other desired shape and of any desired size.

Having thus described my invention, I claim as new and desire to secure by Letters Patent—

1. The combination of the furnace A, the basket B, and the hinged grate C, substantially as herein shown and described.

2. The combination of the hinged supporters D, the detached grate G, the baking-pan F, and the oven E with the furnace A and the basket B, substantially as herein shown and described.

ANTOINE BERNARD DEMBRUN.

Witnesses:
 F. MIGUET,
 ERNEST MOREL.